(12) United States Patent
Wang et al.

(10) Patent No.: US 7,785,743 B2
(45) Date of Patent: Aug. 31, 2010

(54) HUMIDIFYING DEVICES AND METHODS FOR PROTON EXCHANGE MEMBRANES OF FUEL CELLS

(75) Inventors: Chuanfu Wang, Shenzhen (CN); Yong Zhou, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 1116 days.

(21) Appl. No.: 11/200,707

(22) Filed: Aug. 9, 2005

(65) Prior Publication Data

US 2006/0040151 A1    Feb. 23, 2006

(30) Foreign Application Priority Data

Aug. 17, 2004    (CN) .................... 2004 1 0051189

(51) Int. Cl.
*H01M 8/04* (2006.01)
*B01D 11/04* (2006.01)
(52) U.S. Cl. .................. 429/400; 429/414; 429/408; 429/413; 261/83
(58) Field of Classification Search .................. 429/12, 429/13
See application file for complete search history.

(56) References Cited

U.S. PATENT DOCUMENTS 5,432,020 A    7/1995    Fleck
6,696,186 B1   2/2004    Herdeck et al.
6,871,844 B2 * 3/2005    Yan et al. .................... 261/154

FOREIGN PATENT DOCUMENTS

JP    2006-244785    *    9/2006

* cited by examiner

*Primary Examiner*—Dah-Wei D Yuan
*Assistant Examiner*—Amanda Barrow
(74) *Attorney, Agent, or Firm*—Venture Pacific Law, PC

(57) ABSTRACT

The present invention discloses methods and devices for humidifying the proton exchange membranes of fuel cells with water obtained from the exhaust of the fuel cells. Humidifying methods include the following steps: cooling the hot and humid exhaust of the fuel cell to condense the water in the exhaust with the intake gas for the fuel cell; separating the water from the rest of the exhaust, and, delivering the water to the intake gas of the fuel cell. Humidifying devices include an outer shell containing a rotating inner shell. The inside of the inner shell forms a chamber where the exhaust is collected and cooled, and water is condensed and separated by the rotation of the inner shell. Openings on the inner shell allow the condensed water to pass through to one or more chambers containing the intake gas. The chambers are formed by the inside of the outer shell and the outside of the inner shell. Humidifying devices methods and devices of this invention can respond to the varying power output of the fuel cell. They also have high humidifying efficiency, low energy consumption, are cheap to operate, and work well during startup at low temperatures.

10 Claims, 2 Drawing Sheets

HUMIDIFYING DEVICES AND METHODS FOR PROTON EXCHANGE MEMBRANES OF FUEL CELLS

CROSS REFERENCE

This application claims priority from a Chinese patent application entitled "Humidifying Methods and Devices for Proton Exchange Membranes of Fuel Cells" filed on Aug. 17, 2004, having a Chinese Application No 200410051189. This application is incorporated herein by reference.

FIELD OF INVENTION

This invention relates to fuel cells. Particularly, it relates to humidifying devices and methods for proton exchange membranes of fuel cells.

BACKGROUND

Fuel cells are batteries that directly convert chemical energy to electrical energy, utilizing air and oxygen as oxidants and hydrogen, methyl alcohol or ethyl alcohol as fuel. They are highly efficient, quiet, and reduce pollution. Like conventional batteries, fuel cells comprise of a separation membrane that separates the positive and negative electrodes. This separation membrane is pervious to gases but impervious to liquids and can prevent explosions that would result from the mixing of the oxidants and fuels. Catalysts on each side of the separation membrane catalyze the reaction between the positive and negative electrodes. For example, for proton exchange membrane fuel cells that use hydrogen as fuel and air as oxidants, the following reactions occur when the fuel cell operates:

Negative electrode: $H_2 \rightarrow 2H^+ + 2e$

Positive electrode: $O_2 + 4H^+ + 4e \rightarrow 2H_2O$,

During operation, the hydrogen at the negative electrode diffuses through a porous material to the catalyst layer where oxidation occurs and the hydrogen fuel loses its electrons to form protons. The electrons migrate to the positive electrode through an external circuit, while the protons migrate to the positive electrode through the separation membrane. The oxidants at the positive electrode diffuse through a porous material to the catalyst layer, accept the electrons from the external circuit, and combine with the protons that have migrated through the separation membrane to generate water.

The water content of the separation membrane in fuel cells is critical for the normal operation of the fuel cells. The protons generated at the catalyst layer of the negative electrode have to be hydrated in order to pass through the separation membrane to the catalyst layer of the positive electrode. When the proton exchange membrane has insufficient water, it is difficult for the protons to pass through the membrane. This increases the internal electrical resistance of the fuel cell and can reduce the output voltage to the extent that the fuel cell can no longer operate. Although a fuel cell produces large quantities of water during operation, the high temperature of the un-reacted gases can remove large quantities of water. If the water content in the intake gas to the fuel cell is low, the imbalance in the quantity of water in the fuel cell will result in a shortage of water in the membrane. Therefore, it is usually necessary to humidify the gas within the fuel cell to prevent dehydration of the proton exchange membrane.

One commonly used method to humidify the membrane is to directly pass the gas of the fuel cell through water at predetermined temperature such that the gas acquires humidity from its contact with water. However, this method is only suitable for small fuel cells with smaller humidifying needs as this methodology requires the use of large equipment, is inflexible, and difficult to control.

U.S. Pat. No. 5,432,020 discloses a method that externally adds the large quantity of de-ionized water that a fuel cell requires. The implementation of this method is difficult. In addition, the cost is increased for fuel cells using this method as separate replenishment of large quantities of de-ionized water is necessary.

U.S. Pat. No. 6,696,186 discloses a method to diffuse water through the membrane. This method creates a high gas resistance. In addition, it again increases the cost of the fuel cell as it requires the use of expensive ion exchange membranes.

An important application of fuel cells is as a power source for automobiles. This type of application requires that the fuel cells have an excellent dynamic response. The two previously disclosed methods for humidification have poor dynamic response properties and cannot adapt to rapid changes in power.

Due to the limitations of the prior art, it is therefore desirable to have novel methods of and devices for humidifying the proton exchange membrane of fuel cells that are inexpensive and easy to implement.

SUMMARY OF INVENTION

An object of this invention is to provide methods and devices for humidifying the proton exchange membrane of fuels cells that can respond to varying power output of the fuel cell.

Another object of this invention is to provide methods and devices for humidifying the proton exchange membrane of fuel cells that have high humidifying efficiency, low energy consumption, are inexpensive to operate, and works well during startup at low temperatures.

Briefly, the present invention discloses methods and devices for humidifying the proton exchange membranes of fuel cells with water obtained from the exhaust of the fuel cells. Humidifying methods include the following steps: cooling the hot and humid exhaust of the fuel cell to condense the water in the exhaust with the intake gas for the fuel cell; separating the water from the rest of the exhaust, and delivering the water to the intake gas of the fuel cell. Humidifying devices include an outer shell containing a rotating inner shell. The inside of the inner shell forms a chamber where the exhaust is collected and cooled, and water is condensed and separated by the rotation of the inner shell. Openings on the inner shell allow the condensed water to pass through to one or more chambers containing the intake gas. The chambers are formed by the inside of the outer shell and the outside of the inner shell.

An advantage of this invention is that the methods and devices for humidifying the proton exchange membrane of fuels cells of this invention can respond to the varying power output of the fuel cell.

Another advantage of this invention is that methods and devices for humidifying the proton exchange membrane of fuel cells have high humidifying efficiency, low energy consumption, are cheap to operate, and work well during startup at low temperatures.

DESCRIPTION OF DRAWINGS

The foregoing and other objects, aspects and advantages of the invention will be better understood from the following detailed description of preferred embodiments of this invention when taken in conjunction with the accompanying drawings in which.

DETAILED DESCRIPTION OF PREFERRED EMBODIMENTS

Figure 1:
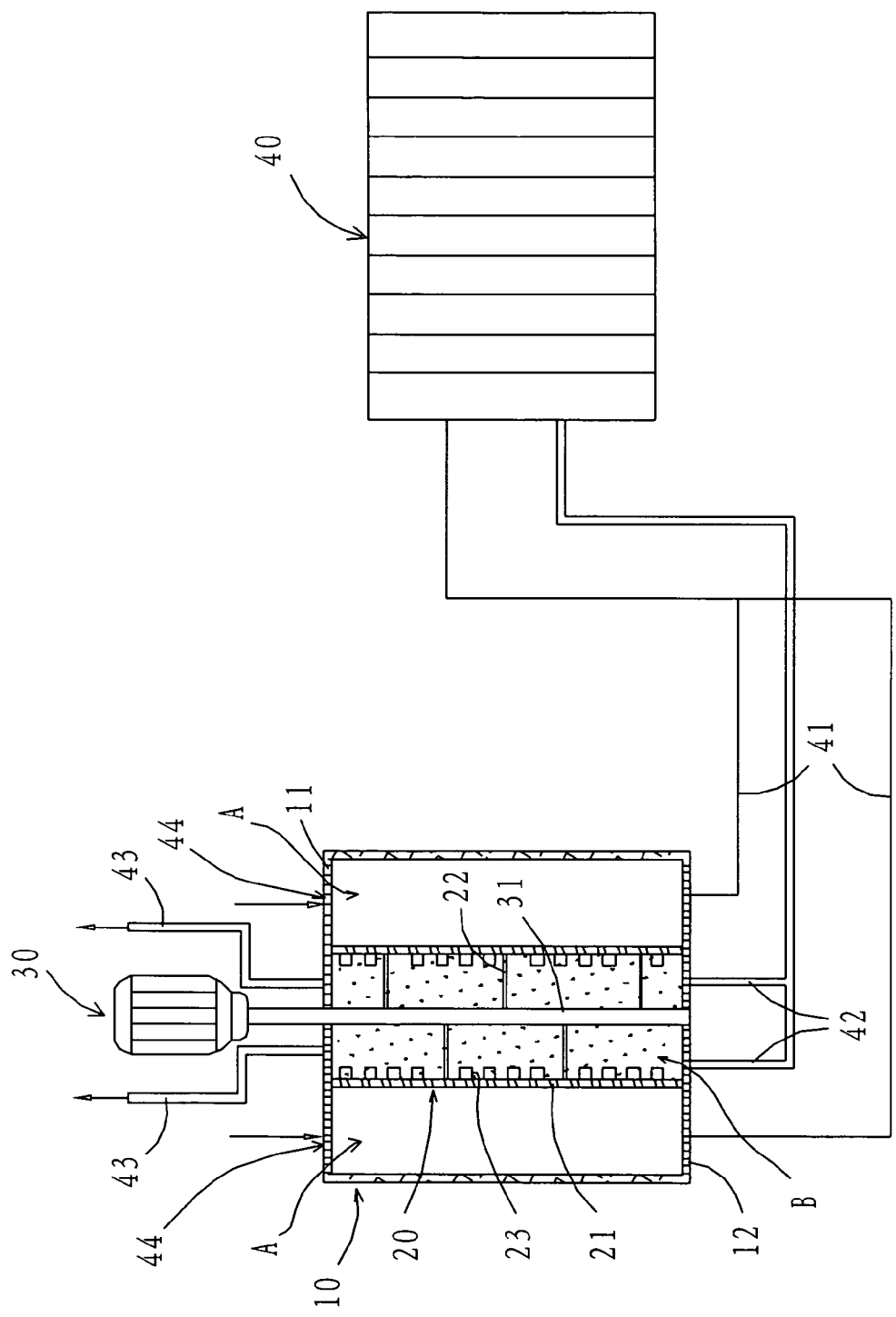
FIG. 1 is a schematic diagram of an embodiment for humidifying the proton exchange membrane of a fuel cell.

Presently preferred methods of the present invention are for humidifying the proton exchange membranes of fuel cells with water contained in the exhaust of fuel cells. This exhaust, produced from the electrochemical reaction between the positive and negative electrodes has high moisture content. Its temperature is between the temperature of the surrounding environment and 85° C. The methods include the following steps:

receiving the exhaust from said fuel cell;
condensing the water from said exhaust;
separating the condensed water from said exhaust; and
delivering the separated water to the intake gas of said fuel cell to humidify said intake gas.

The humidified intake gas then humidifies the proton exchange membrane. In preferred embodiments, the temperature of the exhaust is cooled to between 0° C. and 10° C. by heat exchange between the exhaust and the intake gas of the fuel cell such that the moisture from the exhaust is condensed into water. This water is then separated from the other gaseous matter in the exhaust, preferably by centrifugal separation, and delivered to the intake gas.

The above method can be implemented in humidifying devices that are embodiments of the present invention and that include:

an outer shell having a first inside surface;
a rotating inner shell having a second inside surface and a first outside surface wherein a first chamber is formed by the second inside surface of said inner shell; at least part of said inner shell is contained within said outer shell; at least one second chamber is formed by said first inside surface of said outer shell and said first outside surface of said inner shell; and said inner shell having at least one first opening from said first chamber to said second chamber;
means for receiving the exhaust from said fuel cell into said first chamber;
means for receiving the intake gas for said fuel cell into said second chamber; and
means for the intake gas to exit said second chamber.

In preferred embodiments, these means for receiving the exhaust from said fuel cell into said first chamber, means for receiving the intake gas for said fuel cell into said second chamber, and means for said intake gas to exit said second chamber are pipes, hatches, or openings to allows the flow of gas into or out of said chambers. In one embodiment, the exhaust pipes of the fuel cell are connected to the first chamber such that the exhaust from the exhaust pipes is received into the first chamber. The intake gas flows from intake gas pipes or hatches into the second chamber that totally or partially surrounds the first chamber. Heat exchange can occur between the higher temperature exhaust in the first chamber and the cooler intake gas in the second chamber such that the water from the exhaust is be condensed. A motor, preferably outside the first and second chambers, is connected to the inner shell by a transmission. This motor drives and rotates the inner shell. The rotating inner shell separates the condensed water from the other gaseous content of the exhaust. The inner shell contains a plurality of openings or pores distributed either uniformly or non-uniformly such that the condensed water in the first chamber can be spinned through the pores into the second chamber to humidify the intake gas. Protuberances can also be uniformly or non-uniformly placed on the second inside surface of said inner shell. The humidified intake gas then exits the second chamber through a pipe and is delivered to the fuel cell to humidify the proton exchange membrane.

The preferred embodiment is a cylindrical is a device where the outer shell is a stationery cylindrical shell having an upper cap and a lower cap such that the outer cylindrical shell is airtight;
said upper cap and lower cap each having a circular groove;
said inner shell is an open cylindrical shell inside said outer shell;
said inner shell having a circular upper end and a circular lower end;
said circular upper end of said inner shell is in said circular groove of said upper cap;
said circular lower end of said inner shell is in said circular groove of said lower cap;
said inner shell rotates around the axis of said cylindrical inner shell;
said circular upper end of said inner shell rotates in said circular groove of said upper cap; and
said circular upper end of said inner shell rotates in said circular groove of said upper cap.

Preferably, the rotating inner shell is driven by a motor outside both the inner and outer shell and connected to the inner shell by a transmission. The open ends of the inner cylindrical shell are inserted into the grooves of the upper and lower cap such that inner shell can rotate around its axis with its ends rotating in the grooves. In order for the inner shell to be more airtight, seals are placed in the grooves so that the ends of the rotating cylinder are in contact with the seals. Exhaust pipes from the fuel cell deliver the exhaust into the cylindrical first chamber. A plurality of the openings or pores, distributed either uniformly or non-uniformly through the inner shell allows the condensed water to be spun off by centrifugal separation from the first chamber to the second chamber containing the intake gas of the fuel cell. A plurality of protuberances can also be placed either uniformly or non-uniformly on the second inside surface of said inner shell.

The methods and embodiments of this invention skillfully use the water from the exhaust of the fuel cell to humidify the dry and cold intake gas of fuel cells which in turn humidifies the proton exchange membrane such that no additional de-ionized water is needed for the humidifying process. This significantly reduces the operating cost of fuel cells. This humidifying device can also adapt to the different humidifying needs of the fuel cell at varying power outputs by controlling the rotational speed. The rotational speed is controlled by varying either the voltage or the current of the motor. It also has the additional benefit of alleviating the startup problem for these batteries at low temperature as the intake gas of the fuel cell is heated by the exhaust during the heat exchange. Embodiments of this invention also have high humidifying efficiency and low energy consumption.

The following embodiment further explains and describes this invention in detail.

The humidifying methods for the proton exchange membranes of fuel cells of this invention includes the following steps:

receiving the exhaust from said fuel cell;
condensing the water from said exhaust;
separating the condensed water from said exhaust; and
delivering the separated water to the intake gas of said fuel cell to humidify said intake gas.

Figure 2:
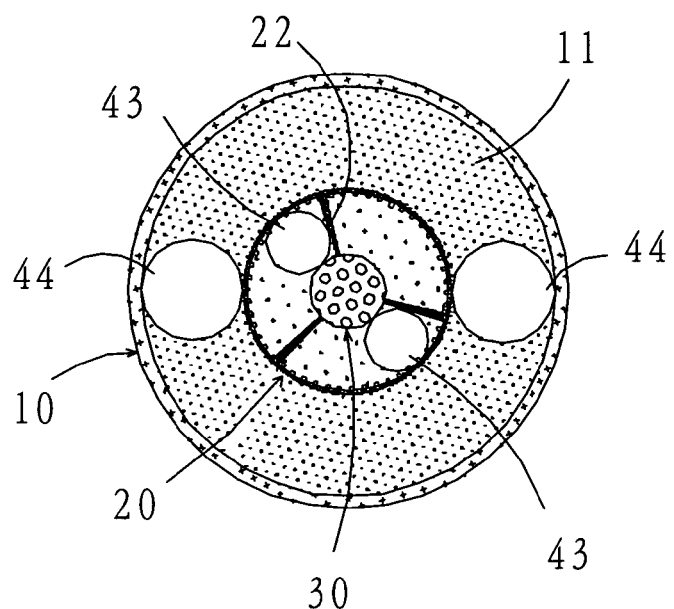
FIG. 2 is a schematic diagram of the upper cap of an embodiment for humidifying the proton exchange membrane of a fuel cell.
Figure 3:
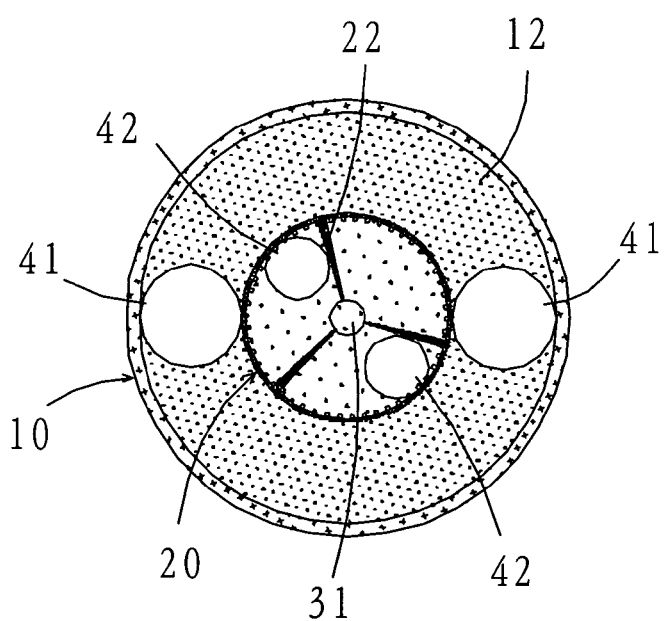
FIG. 3 is a schematic diagram of the lower cap of an embodiment for humidifying the proton exchange membrane of a fuel cell.

Preferably, the above stated humidifying method is implemented using an embodiment of the humidifying device that is illustrated in FIGS. 1 through 3. The embodiment in FIGS. 1 to 3 has a stationary airtight outer cylindrical shell (10). The outer shell is made of materials of a predetermined strength and that has the ability to preserve heat. An example of such material is engineered plastics. A motor (30) drives and rotates the inner cylindrical cell (20) along its axis. The inner shell is made of stainless steel or other metal materials with a predetermined strength and excellent heat conduction properties. The inner shell is mesh-like, full of openings or pores (21) for centrifugal separation. These centrifugal separation pores can be uniformly or non-uniformly distributed on the second inside surface of the inner shell (20). These pores allow the condensed water that are spun off by centrifugal separation and cooled on the wall of the inner shell to enter the second chamber where the intake gas for the fuel cell is located. Protuberances are either uniformly or non-uniformly distributed on the second inside surface of the inner shell (20). These protuberances can prevent the cooled water that is attached on the wall of the inner shell from being rapidly removed by the exhaust in said first chamber.

In order to seal the inner and outer shell, there is a dynamic seal structure on the two ends of the inner shell and the outer shell. This dynamic seal structure is an upper cap (11) and a lower cap (12) made of polytetrafluoroethylene located at the two ends of the outer tube. The upper cap (11) has an opening for intake gas (44). Circular grooves (not shown in the figure) are located on the inner sides of the upper cap and the lower cap corresponding to where the open ends of the cylindrical inner shell meet the upper and lower caps. The outside diameter of the said concave groove is slightly larger than the diameter of the inner shell. There is a circular seal in each of the grooves. The two open ends of the inner shell are inserted in the two grooves such that the ends can rotate in the groove as the inner cylindrical shell is rotating around its axis. This dynamic seal structure will prevent gas leakage.

The second chamber (A) between said outer shell (10) and said inner shell (20) forms the chamber for the intake gas of the fuel cell. Intake gas pipes or hatches (44) deliver the intake gas to said second chamber and intake gas pipes (41) of the fuel cell connect said second chamber with the fuel cell (40) and delivers the humidified intake gas to the fuel cell and its proton exchange membrane. The pipe diameters and hatch sizes are selected to provide the gas flow necessary for the operation of the fuel cell. The second inside surface of the inner shell forms the first chamber for the high temperature, high humidity exhaust from the fuel cell. The exhaust pipes of the fuel cell (42) at one end of the inner shell deliver the exhaust to said first chamber (B). After humidification, the de-humidified exhaust is released from said first chamber (B) through the exhaust release pipes (43) at the other end of said inner shell. The pipe diameters for these pipes are selected to provide the gas flow necessary for exhaust discharge for the.

A motor (30), positioned outside of said inner shell (20) and outer shell (10) drives the rotating motion of said inner shell along the axis of the inner shell (20). A transmission connects this motor with the inner shell. This transmission has a transmission shaft (31) along the axis of the cylindrical inner shell at the center of said first chamber. This transmission shaft has multiple radial connecting rods (22) emanating from the transmission shaft in the radial direction of the inner cylindrical shell. The ends of these radial connecting rods are rigidly secured to the second inside surface of the inner shell such that the inner shell and the transmission form a rigid structure.

The power for the motor can be supplied by an external power source or directly from the fuel cell itself. The voltage or current controls the rotation speed of the motor and the inner shell. During operation, the motor drives the rotation of the transmission shaft (31) along the axis of the cylindrical shell. This rotation of the transmission shaft in turn drives the synchronous rotation of the inner shell (20) on its axis.

The humidifying process for proton exchange membrane of the fuel cells by this embodiment is as follows: When the fuel cell (40) is operating, the exhaust from the electrochemical reaction enters this humidifying device through the exhaust pipe of the fuel cell (42). Since the inner shell (20) is made of stainless steel or other metal materials with excellent heat-conducting properties, after the exhaust enters the first chamber of the inner shell (20), most of the heat in the exhaust is absorbed by the dry and cold intake gas. This intake gas enters the second chamber (A) from the intake gas pipes or hatches (44). Heat exchange occurs between the dry and cold intake gas in said second chamber (A) and the hot and humid exhaust in said first chamber (B). The intake gas is heated while the exhaust is cooled rapidly. The dew point temperature of the exhaust decreases rapidly and a large quantity of water is condensed from the exhaust. The condensed water attaches to the rotating inner shell, is spun off centrifugally and enters the second chamber (A) through the centrifugal separation pores or openings (21). The water humidifies the dry and cold intake gas and is delivered to the fuel cell (40) and its proton exchange membrane by the intake pipes of the fuel cell ((41) to humidify the membrane and participate in the electrochemical reaction of the fuel cell. The dehumidified exhaust, together with a small quantity of water is released through the exhaust release pipes (43) on the inner shell.

During the operation of this embodiment, a small quantity of exhaust may enter the second chamber and be delivered to the fuel cell along with the humidified intake gas. However, this addition of the exhaust to the intake gas does not affect the operation of the fuel cell.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but also all those other and further alterations and modifications as would be apparent to those of ordinary skilled in the art.

We claim:

1. A method for humidifying the membrane of a fuel cell, comprising the steps of:

receiving exhaust from said fuel cell into a first chamber, wherein said exhaust contains water, and wherein said first chamber is formed by an inner shell having a plurality of pores;

condensing the water from said exhaust using said first chamber;

receiving intake gas for said fuel cell into a second chamber, wherein said second chamber is formed by an outer shell;

separating the condensed water from said exhaust by rotating the inner shell to move the condensed water to said second chamber via said plurality of pores;

releasing said exhaust from said first chamber, wherein there is a direct flow of the exhaust into said first chamber, through said first chamber, and out of said first chamber;

humidifying the intake gas using the separated water; and releasing the humidified intake gas to the fuel cell, wherein there is a direct flow of the intake gas into said second chamber, through said second chamber, and out of said second chamber;

wherein said inner shell is contained within said outer shell; wherein said inner shell is mesh-like having a plurality of pores allowing the condensed water to pass from said first chamber to said second chamber; wherein the inner shell and the outer shell each having two ends, said inner shell and said outer shell sharing an upper cap and a lower cap, and there is a dynamic seal structure on the two ends of the inner shell and the outer shell; wherein the dynamic seal structure is formed in part by the upper cap and the lower cap; wherein there is a circular groove located on each of the upper cap and the lower cap; wherein there is a circular seal in each of the grooves; and wherein the inner shell is inserted in the two grooves such that the ends of the inner shell can rotate in the grooves.

2. The method for humidifying the membrane of a fuel cell of claim 1 wherein
in said condensing step, the water is condensed from the exhaust by cooling said exhaust with said intake gas.

3. The method for humidifying the membrane of a fuel cell of claim 2 wherein
in said condensing step, said exhaust is cooled by heat exchange with said intake gas.

4. The method for humidifying the membrane of a fuel cell of claim 1 wherein in said separating step, the water is separated from said exhaust using centrifugal separation generated by rotating the inner shell.

5. The method for humidifying the membrane of a fuel cell of claim 1 wherein said exhaust is the oxidant for said fuel cell.

6. The method for humidifying the membrane of a fuel cell of claim 2 wherein
in said separating step, the condensed water is separated from said exhaust using centrifugal separation generated by the inner shell.

7. The method for humidifying the membrane of a fuel cell of claim 1 wherein said
condensing step further comprising the steps of:
receiving said intake gas of said fuel cell into said second chamber;
cooling said exhaust in said first chamber with said intake gas from said second chamber; and
condensing the water from said cooled exhaust.

8. The method for humidifying the membrane of a fuel cell of claim 1 wherein said inner shell has a plurality of protuberances.

9. The method for humidifying the membrane of a fuel cell of claim 1 wherein
in said separating step, the condensed water is separating from the exhaust with centrifugal separation by rotating said inner shell.

10. The method for humidifying the membrane of a fuel cell of claim 7 wherein in said delivering step, the water is delivered to said intake gas in said second chamber through at least one of said pores.

* * * * *